C. A. PARSONS, S. S. COOK AND L. M. DOUGLAS.
GLAND FOR PACKING ROTARY SHAFTS.
APPLICATION FILED SEPT. 10, 1919.
1,332,062.
Patented Feb. 24, 1920.
2 SHEETS—SHEET 1.
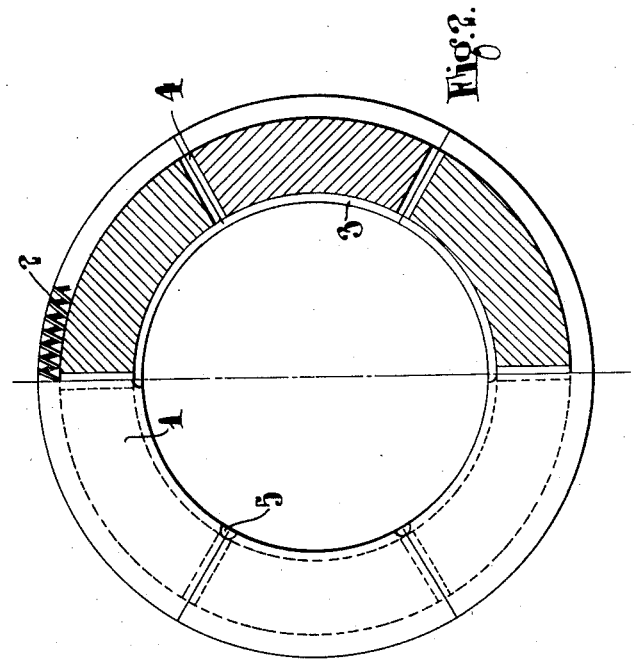
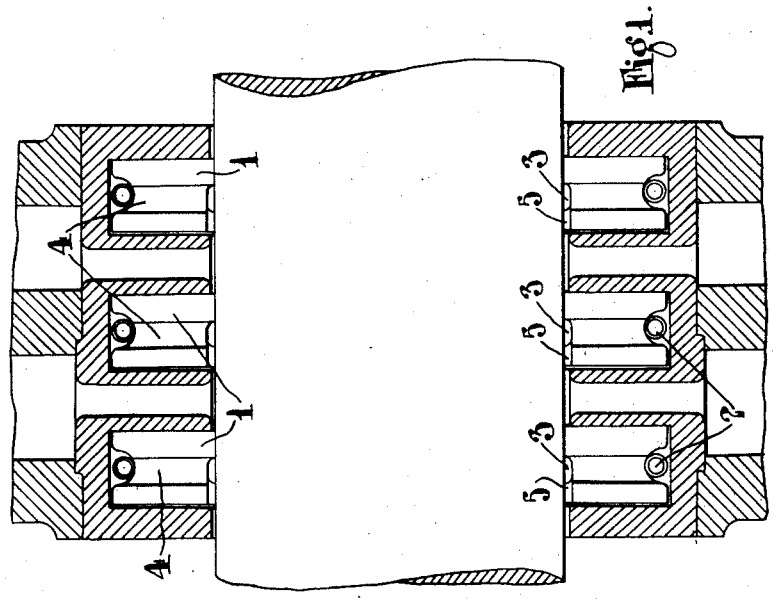

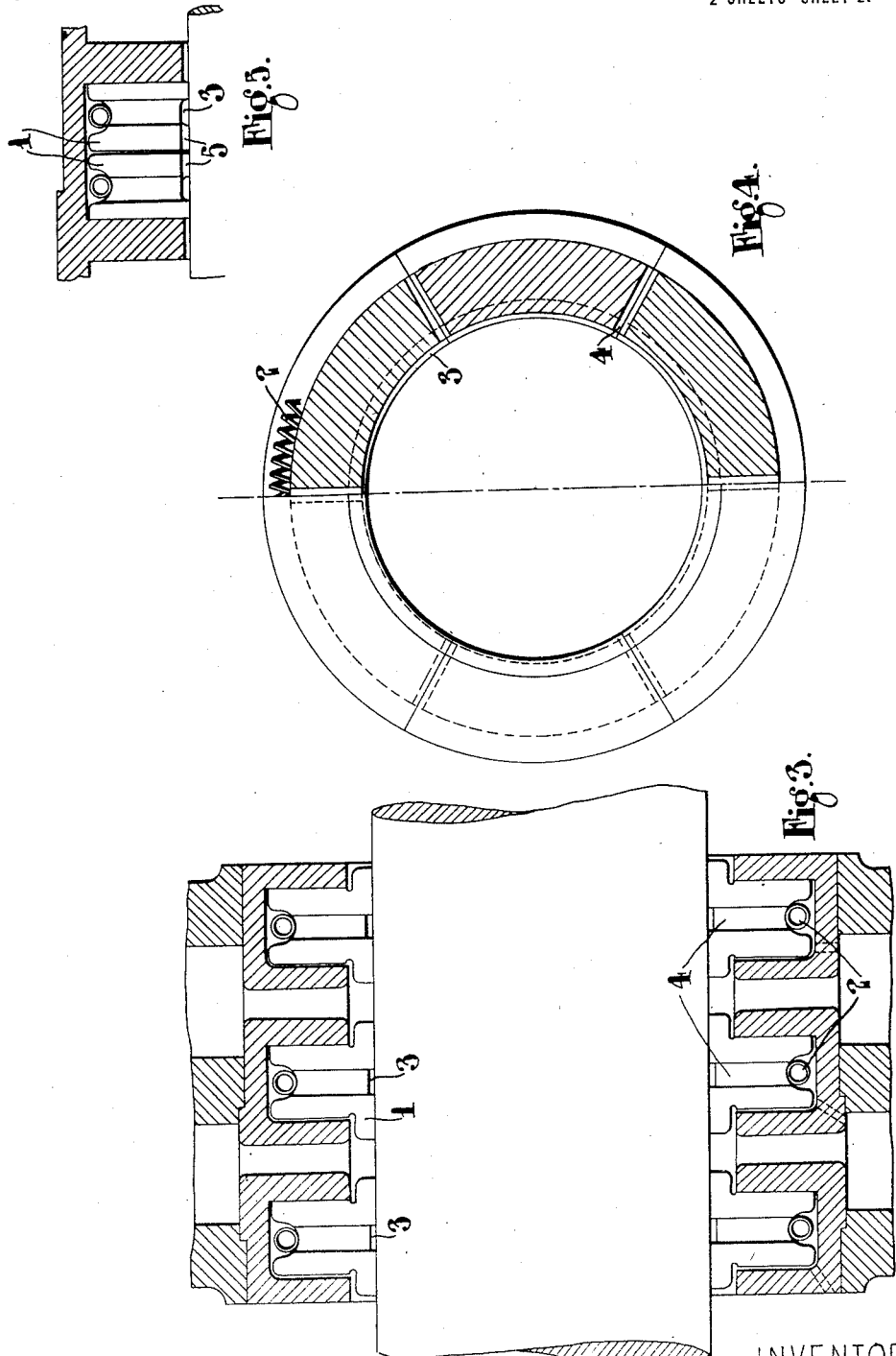

UNITED STATES PATENT OFFICE.

CHARLES ALGERNON PARSONS, STANLEY SMITH COOK, AND LOUIS MORTIMER DOUGLAS, OF NEWCASTLE-UPON-TYNE, ENGLAND; SAID COOK AND SAID DOUGLAS ASSIGNORS TO SAID PARSONS.

GLAND FOR PACKING ROTATING SHAFTS.

1,332,062.  Specification of Letters Patent.  Patented Feb. 24, 1920.

Application filed September 10, 1919. Serial No. 322,962.

*To all whom it may concern:*

Be it known that we, CHARLES ALGERNON PARSONS, K. C. B., STANLEY SMITH COOK, and LOUIS MORTIMER DOUGLAS, all subjects of the King of Great Britain and Ireland, and residing at Heaton Works, Newcastle-upon-Tyne, in the county of Northumberland, England, have invented certain new and useful Improvements in Glands for Packing Rotating Shafts, of which the following is a specification.

This invention relates to glands for packing rotating shafts of the type consisting of a ring divided radially into a number of arc-shaped portions which bear independently on the shaft.

The object of the invention is to produce a gland which, while being steam-tight at high pressures, will have the minimum amount of friction on the shaft.

In British specification No. 18,609 of 1918, a method of accomplishing this object has already been described by us in connection with rings of L-shaped cross section. Now, it has been found that this method is applicable not only to rings of that particular section, but also to rings of rectangular, inverted T, and other sections, and that further the method may be usefully applied to rings other than those made of carbon or similar materials.

The invention consists in divided packing rings for rotating shafts provided on the internal periphery with a circumferential groove placed in communication with steam on the high pressure side of the ring.

The invention also consists in providing in the packing rings radial ducts to admit high pressure steam to the internal circumferential groove.

The invention further consists in providing longitudinal grooves in the internal periphery of the ring to admit high pressure steam to the internal circumferential groove.

The invention also consists in the improved gland rings hereinafter described and illustrated in the accompanying drawing.

Referring to the drawing:

Figures 1 and 2 are respectively a longitudinal elevation and an end view partly in section of a gland constructed in accordance with the invention.

Figs. 3 and 4 are corresponding views of a modification.

Fig. 5 illustrates in longitudinal section the application of the type of gland ring shown in Figs. 1 and 2 to a gland in which the higher pressure may occur on either side.

In carrying the invention into effect according to the manner illustrated in Figs. 1 and 2, we provide gland rings 1 of rectangular cross-section and divided in the well known manner into segments which are held together and in contact with the shaft by a helical garter spring 2 and also by high pressure steam admitted to the external peripheries of the rings. A circumferential groove 3 is formed in the internal periphery of each ring, being preferably placed as indicated to one side of the center line of the ring toward the high pressure, which in Figs. 1 and 3 is assumed to be acting from the left. High pressure steam is admitted to the grooves 3 either by means of radial ducts 4 or by longitudinal grooves 5 cut in the internal surface of the rings, or as indicated in Figs. 1 and 2 both means may be employed.

We have illustrated the ducts 4 and grooves 5 as occurring at the joints between the ring segments. This, however, is not essential as the ducts and grooves may equally well be formed in the body of each segment.

Figs. 3 and 4 illustrate an application of the invention to rings of inverted T-shape, the grooves 3 being shown centrally disposed in each ring.

While the method of admitting steam to the grooves 3 by means of ducts 4, as indicated, is preferable in this construction, internal grooves 5 might also be employed either in addition to or instead of the ducts 4. If, however, the ducts 4 only be used the packing is suitable for employment in a gland in which the higher pressure may occur on either side. If in such a case it be desired to use the form of ring having internal grooves 5, the arrangement indicated in Fig. 5 may be adopted, that is to say two rings 1 are placed within a single groove in the housing, a small space, with which the grooves 5 communicate and to which high pressure has access, being left between them.

The invention is, however, not limited in application to any particular section of ring, nor is it to be regarded as confined to rings of any particular material.

Further, although we have described the groove as being preferably placed somewhat nearer the high pressure side than the low pressure side, this point is immaterial, as it may be placed centrally or in any other position The means also which have been described of placing the groove in communication with high pressure steam are not to be regarded as the only method which might be employed for this purpose.

Having now described our invention what we claim as new and desire to secure by Letters Patent is:—

1. In glands for rotating shafts, divided packing rings provided on the internal periphery with a circumferential groove placed in communication with steam on the high pressure side of the ring.

2. In packing rings as set forth in claim 1, providing radial ducts to admit high pressure steam to the internal circumferential groove.

3. In packing rings as set forth in claim 1, providing longitudinal grooves in the internal periphery of the ring to admit high pressure steam to the internal circumferential groove.

4. In packing rings as set forth in claim 1, providing radial ducts to admit high pressure steam to the internal circumferential groove, said radial ducts being at the ends of the sections of the divided ring substantially as described.

In testimony whereof we have signed our names to this specification.

CHARLES ALGERNON PARSONS.
STANLEY SMITH COOK.
LOUIS MORTIMER DOUGLAS.